(12) United States Patent
Becker

(10) Patent No.: US 8,070,933 B2
(45) Date of Patent: Dec. 6, 2011

(54) ELECTROLYTIC MICROFINISHING OF METALLIC WORKPIECES

(75) Inventor: Manfred G. Becker, Novi, MI (US)

(73) Assignee: Thielenhaus Microfinishing Corp., Novi, MI (US)

(*) Notice: Subject to any disclaimer, the term of this patent is extended or adjusted under 35 U.S.C. 154(b) by 1017 days.

(21) Appl. No.: 11/382,016

(22) Filed: May 6, 2006

(65) Prior Publication Data

US 2006/0249398 A1    Nov. 9, 2006

Related U.S. Application Data

(60) Provisional application No. 60/678,854, filed on May 6, 2005.

(51) Int. Cl.
*B23H 3/00* (2006.01)

(52) U.S. Cl. ............... 205/647; 204/224 M; 204/228.6; 204/228.7; 204/228.8; 205/651; 205/662

(58) Field of Classification Search ............... 204/224 M, 204/228.6, 228.7, 228.8; 205/647, 651, 662
See application file for complete search history.

(56) References Cited

U.S. PATENT DOCUMENTS

| | | | |
|---|---|---|---|
| 3,043,766 A | 7/1962 | Williams | |
| 3,117,919 A | 1/1964 | Mittelmann | |
| 3,130,138 A | 4/1964 | Faust et al. | |
| 3,162,588 A | 12/1964 | Bell | |
| 3,338,808 A | 8/1967 | Johnson | |
| 3,442,785 A * | 5/1969 | Easton | 204/224 M |
| 3,448,023 A | 6/1969 | Bell | |
| 3,694,340 A * | 9/1972 | Takahashi | 204/224 M |
| 3,816,290 A * | 6/1974 | Suzuki et al. | 204/218 |
| 4,140,598 A | 2/1979 | Kimoto et al. | |
| 4,240,232 A | 12/1980 | Chwae | |
| 4,294,673 A | 10/1981 | Kimoto et al. | |
| 4,328,083 A | 5/1982 | Kimoto et al. | |
| 4,682,444 A | 7/1987 | Judge et al. | |
| 4,849,599 A | 7/1989 | Kuromatsu | |
| 4,948,488 A | 8/1990 | Tsymbal et al. | |
| 5,032,238 A | 7/1991 | Ishimura et al. | |
| 5,045,161 A | 9/1991 | McGregor | |
| 5,071,525 A | 12/1991 | Ushiyama | |
| 5,095,663 A | 3/1992 | Judge et al. | |
| 5,114,548 A | 5/1992 | Rhoades | |
| 5,119,595 A | 6/1992 | Ushiyama et al. | |
| 5,311,704 A | 5/1994 | Barton II et al. | |
| 5,437,125 A | 8/1995 | Barton, II | |
| 5,490,808 A | 2/1996 | Jantschek et al. | |

(Continued)

*Primary Examiner* — Alexa D. Neckel
*Assistant Examiner* — Nicholas A. Smith
(74) *Attorney, Agent, or Firm* — VanOphem & VanOphem, PC

(57) ABSTRACT

The invention is an electrolytic microfinishing process which utilizes a conductive tool as a cathode and a conductive workpiece as an anode both connected to a power supply. Electrolytic fluid is pumped between the tool and workpiece, creating a decomposition of the workpiece surface allowing the surface of the workpiece to be removed or wiped away by the interaction of the flowing electrolyte and rotation of the tool without generating any heat at a rate significantly faster than any other known machining process. The tool has no contact with the workpiece and accordingly, requires very low clamping loads to hold the workpiece in the spindle during the finishing operation. Due to the low clamping loads, the distortion of the workpiece is completely eliminated. Modulating the power supply during the work cycle allows the use of a single tool for both roughing and finishing as a continuous cycle to significantly provide surface finishes previously unobtainable.

4 Claims, 8 Drawing Sheets

U.S. PATENT DOCUMENTS

| | | |
|---|---|---|
| 5,529,529 A | 6/1996 | Judge et al. |
| 5,531,631 A | 7/1996 | Judge |
| 5,664,991 A | 9/1997 | Barton, II |
| 5,720,652 A | 2/1998 | Steinwender et al. |
| 5,722,878 A | 3/1998 | Phillips |
| 5,775,974 A | 7/1998 | Hulsebus |
| 5,803,796 A | 9/1998 | Barton, II |
| 5,816,901 A | 10/1998 | Sirany |
| 5,833,520 A | 11/1998 | Kanda et al. |
| 5,857,895 A | 1/1999 | Falchieri |
| 5,863,239 A | 1/1999 | Barton, II |
| 5,951,377 A | 9/1999 | Vaughn et al. |
| 5,993,296 A | 11/1999 | Rogers |
| 6,162,348 A | 12/2000 | Ohmori |
| 6,220,940 B1 | 4/2001 | Johnson |
| 6,322,426 B1 | 11/2001 | Akagi et al. |
| 6,354,920 B1 | 3/2002 | Judge et al. |
| 6,364,426 B1 | 4/2002 | Horne et al. |
| 6,379,223 B1 | 4/2002 | Sun et al. |
| 6,423,206 B1 | 7/2002 | Haby et al. |
| 6,575,672 B1 | 6/2003 | Maier |
| 6,645,056 B1 | 11/2003 | Gilmore et al. |
| 6,752,699 B2 | 6/2004 | Yanagisawa et al. |
| 2002/0070126 A1* | 6/2002 | Sato et al. ............ 205/640 |
| 2005/0247569 A1* | 11/2005 | Lamphere et al. ............ 205/663 |

* cited by examiner

ELECTROLYTIC MICROFINISHING OF METALLIC WORKPIECES

CROSS REFERENCES TO RELATED APPLICATIONS

This application claims the benefit of provisional U.S. Patent Application Ser. No. 60/678,854, filed on May 6, 2005.

FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The invention relates in general to a method and apparatus of electrolytically microfinishing metallic workpieces. More particularly, this invention has specific reference to the application of electrolytic machining to a microfinishing process with a view to decrease considerably, the cycle time of finishing the workpiece to be treated while reducing appreciably, the cost of the microfinishing operation for a given degree of precision.

2. Description of the Related Art

There are two well know methods of machining work pieces using electrolytic cutting.

The first is electrochemical machining (ECM) which is done by using a cathode having the shape of the part to be machined. The shape of the cathode is transferred to the workpiece (anode) by deplating, similar to electroplating in accordance with Faraday's Laws. In an electrolytic conductive solution, electrical current is applied to the workpiece to de-plate the material while an electrolyte is pumped between the cathode and the workpiece (anode) and prevents the deplated material from plating out on the cathode. For the purpose of this document, the electrolytic process referred to in the various discussions can include both electrical discharge machining and electrochemical machining although they have recognized distinct differences.

The second is electrochemical grinding (ECG). In this process, the cathode is the grinding wheel. As the electric current flows between the workpiece and the wheel, the material removed by electrolysis is carried off by the abrasives in the rotating wheel. The wheel is made of a conductive material into which abrasive particles have been embedded and touches the workpiece very lightly. The tool and workpiece are connected to a direct current source. The electrolyte is applied onto the grinding wheel near the workpiece in a manner that will result in the wheel carrying it into the cut. This brings about electrochemical action, molecular decomposition or deplating of the workpiece.

Electrolytic cutting has advantages over mechanical and heating methods of cutting metals. Electrolytic methods provide cuts that are free from mechanical or thermal strain and thus do not disturb the grain structure of the cut material. Electrolytic cutting methods also avoid the burrs and jagged edges and the avoidance of metal as dust or other small particles in mechanical cutting or as vapor that is evaporated or burned away where a cutting flame is used.

The advantages and techniques involved in removing particles of electrically conductive materials by electrolytic erosion (often called electrochemical decomposition) are also well established in the industry. Both of these electrolytic stock removal processes have been found useful in grinding, as well as shaping operations, particularly when the workpiece materials are extremely hard.

Electrolytic grinding briefly consists of bringing a workpiece against the face of a rotating metal bonded grinding wheel under conditions where a low voltage direct current passes through an electrolyte between the workpiece and a wheel during the operation so as to remove material from the workpiece by electrolytic action. Electrochemical grinding (ECG) is principally used for specialized areas, for example, the grinding of flat surfaces or cutting form surfaces with preformed grinding wheels. In electrolytic grinding, the abrasive particles serve to remove non-conductive films which may form on the surface of the material of the workpiece which is being ground and may serve also to provide abrasive cutting action. By this conjoint electrolytic and abrasive action, the cutting speed is very much enhanced as compared to that obtained by surface grinding alone. On the other hand, it is also possible to rely almost entirely upon electrolytic action thereby reducing the rate of wear on the abrasive particles to a minimum. Because metal removal is largely brought about by non-mechanical action, only about 10% of the conventional grinding wheel pressure is required, corresponding to the fact that only about 10% of the material is removed by the abrasive action of the conductive grinding wheel. Most of the metal removal is brought about by the electrochemical action. The metal removal rate is largely governed by the amount of electric current and electrolyte applied, regardless of the material's hardness. It is possible with good process controls to achieve surface finishes as low as $R_a=0.1$ μm using electrolytic grinding techniques.

In spite of the many advantages, electrolytic decomposition or grinding may provide little or no success that has been achieved in applying the principle of electrolytic erosion to the microfinishing process.

Microfinishing is a somewhat misunderstood process. In the prior art it is at times referred to as superfinishing, lapping, honing, mirror finishing, fine grinding, or just plain finishing. Microfinishing, as used herein is intended to encompass all of the above-listed prior art terminology. Accordingly, microfinishing is a surface finishing process that is performed after rough, medium machining, or fine grinding of the surface of a workpiece, such as a previously machined workpiece or medical prosthesis. Microfinishing is typically performed using a machine that brings some form of rotating and/or oscillating abrasive material into contact with the workpiece while the workpiece is rotated. The abrasive material applied subsequent to a previous machining operation removes any defects, like surface imperfections, and is used to obtain particularly accurate geometrical characteristics of the surface including exceptional surface finishes. Microfinishing is a low temperature machining process which combines the motion of the workpiece and the motion of a bonded abrasive "stone" or "tape" to generate both a geometrically accurate form and specific surface finish. The surface characteristics of the generated surface are typically the function of the specific stone or tape grit size used. The abrasive, under an extremely low and relatively constant force, will produce the repeatable surface characteristics or qualities required generating little or no heat. One advantage of microfinishing is the elimination of the amorphous layer after grinding. The amorphous layer or recast layer is a product of any heat generating process. In machining or grinding with any calculated feed method, the ability of the tool to cut is not the only determining factor for the feed rate. The incoming geometry and the surface finish are also an integral part of the equation. These are at best all variables. In many cases the derived feed rate may be extremely small. In the true microfinishing process, the stone determines the rate and duration of feed depending upon the incoming conditions and geometry of the workpiece. Once the stone has progressed through the soft amorphous layer, however thick, and has reached the solid base material, the stock removal rate will dramatically reduce to the point when the stone glazes. Once this occurs, the geometry generating portion of the process will be complete and the second stage begins. During the second stage, a measurable amount of stock will no longer be removed, but the glazed stone will act as a polishing tool and create the required finish. The specific stone and grit size is picked for its ability to remove the soft amorphous layer, produce the desired geometry and also the required finish. This process induces no metallurgical alteration and provides a clean, burr-free workpiece.

As set forth above, in the first stage, the smooth microfinish tool of bonded abrasive grain contacts the rough surface of the workpiece. The rough surface of the workpiece removes the glazed portion of the stone from the previous operation and aggressive cutting of the amorphous layer begins. During this second stage, the rough abrasive tool surface continues to cut and wear. As the geometry and finish of the workpiece improves, the abrasive surface of the stone also becomes smoother and starts to re-glaze. This results in a lower feed rate and consequently decreases wear. Finally, in the third stage the workpiece and abrasive tool surfaces are both extremely smooth. The ability of the stone to cut is minimal and the final finishing stage is achieved. The cutting speed and contact pressure of the microfinish process are so small that heating of the workpiece surface remains well below a detrimental limit thereby avoiding the generation of a new amorphous layer on the workpiece.

Microfinishing can generate flat, spherical, or cylindrical surfaces. There are three basic types of spherical shapes that are applicable to the microfinish process. These are complete spheres, internal or concave spheres, and partial conical shapes. Flat and complete spherical surfaces are the easiest shapes to achieve a very accurate, uniform geometry and finish, while the partial/conical shape proves to be the most difficult. With carefully selected angular approaches and properly selected stones, results of the relative same degree of accuracies for full spheres can be achieved. Outside diameters on cylinders, shafts, piston and journals, inside diameters and bores are microfinished by using an area contact instead of a line contact as by conventional grinding. This improves the roundness, surface finish and eliminates leads.

Since stock removal is obtained at relatively low cutting forces and speeds, as compared to grinding, this leads to a surface characterized by higher compressive stresses, and the elimination of damage to the finish surface by excessive heat. As discussed above, a first step is used in order to optimize the stock removal and geometry process and then followed by a secondary step in order to create the surface structure required. This second step is characterized by a small stock removal. Abrasive grit sizes can range from approximately 320 to 1500, and include silicon carbide, aluminum oxide, C.B.N. (cubic, boron nitride) and diamond bonded abrasives. Where required, prior art production microfinishing processes achieve cylindrical surfaces with $R_a$ as low as 0.05 µin and with roundness of 1 µin (0.025 µm) $R_a$ is defined as the arithmetical average profile deviation of the surface irregularities with respect to a hypothetical perfect surface established by an arithmetical average line (see U.S. Pat. No. 6,222,628).

In comparison, fine grinding without the use of electrolytic action utilizes tools made of similar abrasives i.e., silicon nitrate, aluminum oxide, C.B.N. or diamond in grit size from 280 to 1200. Since fine grinding involves rotation by either chucking or centerless driving, during the relative rotational motions of the workpiece and wheel, combined with the corresponding contact angle, generates the required surface form i.e., flat, spherical (concave or convex) with a characteristic cross hatch pattern as shown in prior art FIG. 1. The requirements for the same low cutting forces are utilized in the fine grinding process. Surface speeds generally are higher than microfinishing, especially when using C.B.N. or diamond tools. The feed systems utilized are normally very sensitive so as to not force the grinding tool into the work area and develop excessive heat. N.C. feeds are generally not sensitive enough for many applications, and air feed with hydraulic damping is usually preferred. The surface produced by grinding is more or less wavy. It is these wavy surface defects that are eliminated with microfinishing. Temperatures of up to 1100° C. can develop in the line of contact between the workpiece and grinding wheel, generating an amorphous layer, also known as "soft skin". This amorphous layer substantially reduces the load carrying capacity and therefore has to be eliminated by microfinishing in order to take advantage of the maximum performance characteristics of the metallic workpiece. Production fine grinding processes with carefully controlled process parameters can achieve flat surfaces with $R_a$'s as low as 4.0 µin (0.1 µm).

Increased demands for more accurate processing of newly developed materials, shorter lead time, more accurate dimensional as well as surface characteristics has resulted in the investigation of new machine processing techniques. Of course these increased demands are always expected to be developed at lower costs for automotive, diesel engine, aerospace, hydraulic, medical devices and many other precision part manufacturers. In response to these demands there have been some attempts to obtain more accurate dimensional surfaces as well as surface finishing characteristics. For example, U.S. Pat. Nos. 4,140,598 and 4,328,083 to Kimoto et al. disclose a mirror finishing process which combines electrolytic machining with an abrasive tool. In Kimoto et al., abrasive powder is mixed into the electrolyte and under pressure this mixture is forced to flow into the gap between the workpiece and the electrode tool. Kimoto et al. discloses that a clean mirror surface finish of not more than 0.5 µm $R_{max}$ may be obtained when the current density is not more than 2.5 $A/cm^2$. The polishing time being one minute for such result. However, where current density is from 0.5 to 1 $A/cm^2$, a polishing time of 3-5 minutes is required. Kimoto et al. further discloses that either an abrasive cloth or an abrasive buff may be used instead of the abrasive powder mixture of the electrolyte. $R_{max}$ is defined as the largest of the individual surface peak to valley from each sample length.

Further attempts have been made to increase the accuracy of electrolytic machining. For example, Rhoades, U.S. Pat. No. 5,114,548, discloses a method of electrochemical machining a workpiece utilizing an electrode that is passive to the workpiece, wherein the conductive tools are provided with a non-conductive abrasive surface, and the tool and workpiece are brought together with a contacting relative motion so that the abrasive surface will selectively abrade the workpiece to remove any passivation layer therefrom in those areas to be machined and such that the unabraded surface areas will retain the passivation layer to prevent electrochemical machining thereof. Reciprocal motion between the tool and workpiece is also effective to pump the electrolyte through the gap between the tool and workpiece and prevent the workpiece from becoming overheated. Orbital abrading is a nontraditional machining process which is entirely different and distinct from electrochemical machining. Unlike conventional grinding techniques, orbital abrading utilizes a very small relative movement having a radius of orbit, typically of 0.020 to 0.100-inch at a typical rate, of 1200 oscillations per minute. Because of the very small orbital displacement of the workpiece and tool during working, the difference in size is small, and further, permits production of rather detailed and intricate ground configurations with a high degree of resolution, either two or three dimensional forms.

While orbital abrading is a well accepted nontraditional machining process based solely on its own merits, there are other known machining processes wherein orbital abrading, or at least orbital motion between the tool and workpiece, has been combined with other machining techniques. For example, U.S. Pat. No. 3,593,410 issued to Taylor, teaches a machining process which utilizes vibratory motion between an abrasive tool and workpiece wherein the interface is submerged in a solution which will chemically alter the workpiece surface to facilitate a mechanical abrasion. U.S. Pat. No. 3,663,786, issued to O'Connor, teaches an electrical discharge machine tool which provides an abrasive relative motion between the electrode and the workpiece, primarily for the purpose of machining graphite electrical discharge machining electrodes. Of more relevance to this invention, U.S. Pat. No. 3,564,190, issued to Kandajan et al. teaches a number of machining processes including an electrochemical machining process wherein a relative motion, orbital or otherwise is imparted between the tool and workpiece, so that the workpiece is machined by the combined activity of the two processes. This reference does not, however, teach or suggest the unique features of this invention as essential to affect the greater degree of precision, but rather, relies merely on the combined metal removal technique to speed the machining process. Further, the use of a tool with a surface covered with abrasive particles can result in the embedding of abrasive particles into the surface of the article being processed, and this factor can detract from the surface quality of the processed workpiece when an abrasive coated tool is used as a final step in the electrochemical machining process.

BRIEF SUMMARY OF THE INVENTION

The invention relates to an improved microfinishing process for the use on component parts for the automotive, diesel engine, aerospace, hydraulic and medical devices, and many other precision industries. This electrolytic microfinishing process uses solid abrasives to machine geometric accuracies by generating the form which improves or creates surface finishes not previously achieved by any other machining method known to date. The electrolytic microfinishing process allows faster material removal, better surface finishes, burr-free surfaces, significantly reduced holding or contact pressure between the tool and workpiece results in reduced tool wear, reduced cycle time by over 50% of the conventional microfinishing process while creating an abrasive free finished surface. Electrolytic microfinishing machines closely resemble conventional microfinish machines in both appearance and to some degree operation. For example, the tool in all cases, looks just like the conventional abrasive stone, except that the stone contains electrically conductive bonding material to hold the abrasive together. The electrolyte that is used is introduced to the wheel in much the same manner as conventional coolants used in any machining operation. A housing is provided to contain the electrolytic solution. The installation also requires a power supply, a very simple pumping station with the appropriate filtration system to provide the electrolyte from an electrolyte reservoir to the workpiece to be microfinished. Since both the work spindle and tool spindle have been electrically isolated, in operation, the workpiece becomes a positive pole and the tool becomes a negative pole in the direct current circuit. When the current source is switched on, the material of the workpiece is decomposed or dissolved by the electrolyte, which is pumped between the rotating surfaces of the tool and workpiece. The rotating tool near the workpiece results in the tool carrying the electrolyte into the cut which brings about the electrochemical action on the workpiece. Metal removal is largely brought about by non-mechanical action, since the contact pressure between the tool and the workpiece is only a fraction of the pressure used in conventional microfinishing. Thus, the need for frequent dressing of the tool is eliminated. The metal removal rate is largely governed by the amount of electric power and electrolyte applied, regardless of the material's hardness. Because of the dissolving action and relative absence of both heat and tool contact, the electrolytic microfinishing process is ideal for fast stock removal of parts that cannot stand thermal machining damage, as well as result in extremely smooth surface finishes. By eliminating contact between the tool and workpiece, the risk of transfer of abrasive particles from the tool to the workpiece is completely eliminated, thereby ensuring an abrasive-free microfinished surface on the workpiece. This invention is ideally practiced as a final machining step on a workpiece with a surface to be finished by reducing or eliminating one or more metal cutting or machining steps, i.e., turning and/or grinding of a conventional nature. A programmable microfinish process controller monitors the various process parameters using sensors to obtain the optimum performance from each of the process elements.

It is the principle object of the invention to provide a microfinishing apparatus and method which is capable of appreciably reducing the cost of the microfinishing process for a given degree of precision of the overall operation. Accordingly, it is an object of the present invention to provide a method of producing a metallic or conductive workpiece with a microfinished surface that is free of any abrasive particles embedded into the microfinish surface.

It is a further object of the invention to provide an electrolytic microfinishing process resulting in faster material removal thereby significantly reducing the cycle time of the overall operation.

It is still a further object of the invention to provide an electrolytic process which can achieve an optimal work result and is not limited to the stock removal limits of prior art microfinishing machines.

It is a further object of the invention to provide an electrolytic microfinishing process which significantly reduces the number of steps required in order to obtain stock removal and smooth surface characteristics superior to those achievable by any conventional finishing and/or machining process know to date.

It is still a further object of the invention to provide a microfinishing process where the process parameters, e.g. voltage, may be carefully controlled to achieve a superior smoothness characteristic previously unobtainable by any microfinishing process known to date in a single step operation.

It is still a further object of the invention to provide an electrolytic microfinishing process that significantly reduces the overall cost of microfinishing by closely monitoring the parameters of the process and precisely modulate the process parameters to guarantee that optimal levels of current is provided to the workpiece at all times to obtain a given surface smoothness characteristic.

Other advantages of this invention will become apparent to those skilled in the art from the following detailed description of the preferred embodiment, when read in light of the accompanying drawings.

DETAILED DESCRIPTION OF THE PREFERRED EMBODIMENT

The following detailed description discloses a microfinishing process. The use of the term microfinishing is intended to include what is sometimes referred to as superfinishing, mirror finishing, lapping, honing, fine grinding or just plain finishing. In fact, microfinishing is used to describe any machining process which results in superlative surface smoothness characteristics.

Figure 1:
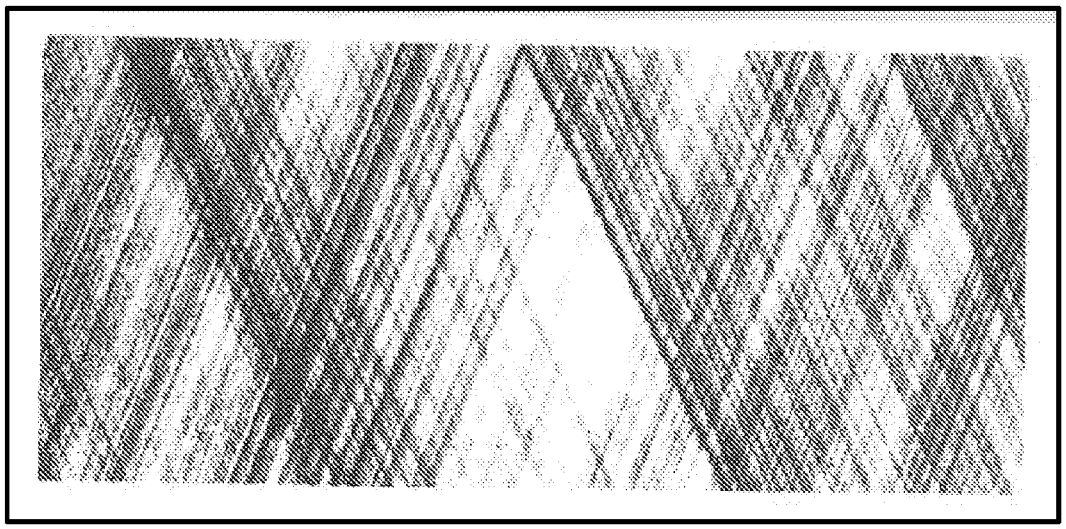
FIG. 1 is a typical prior art surface finish cross hatch pattern of a ground workpiece.
Figure 2:
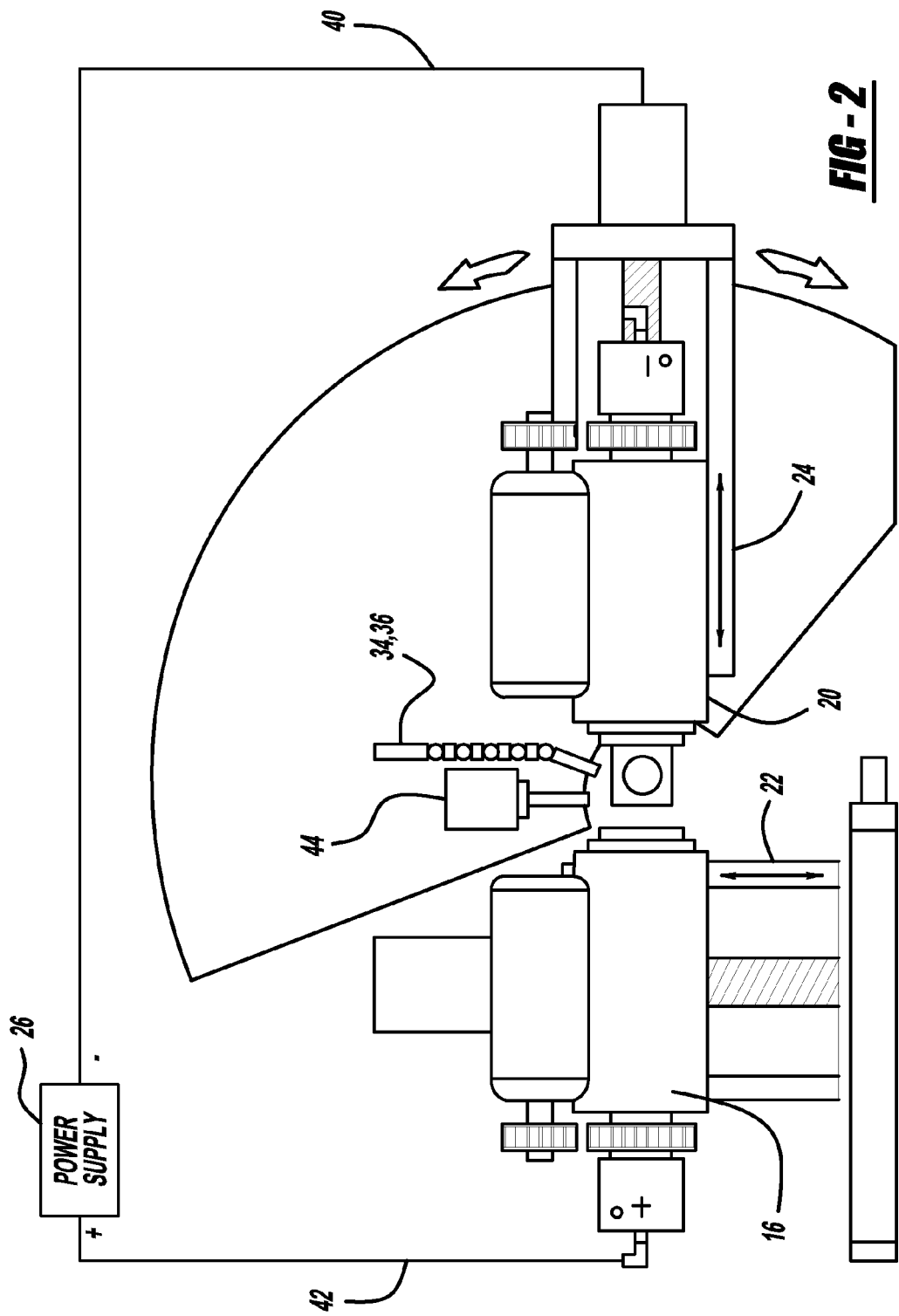
FIG. 2 is a schematic representation of the various machine details of the electrolytic microfinishing machine apparatus of the invention, used in a method according to the present invention.
Figure 3:
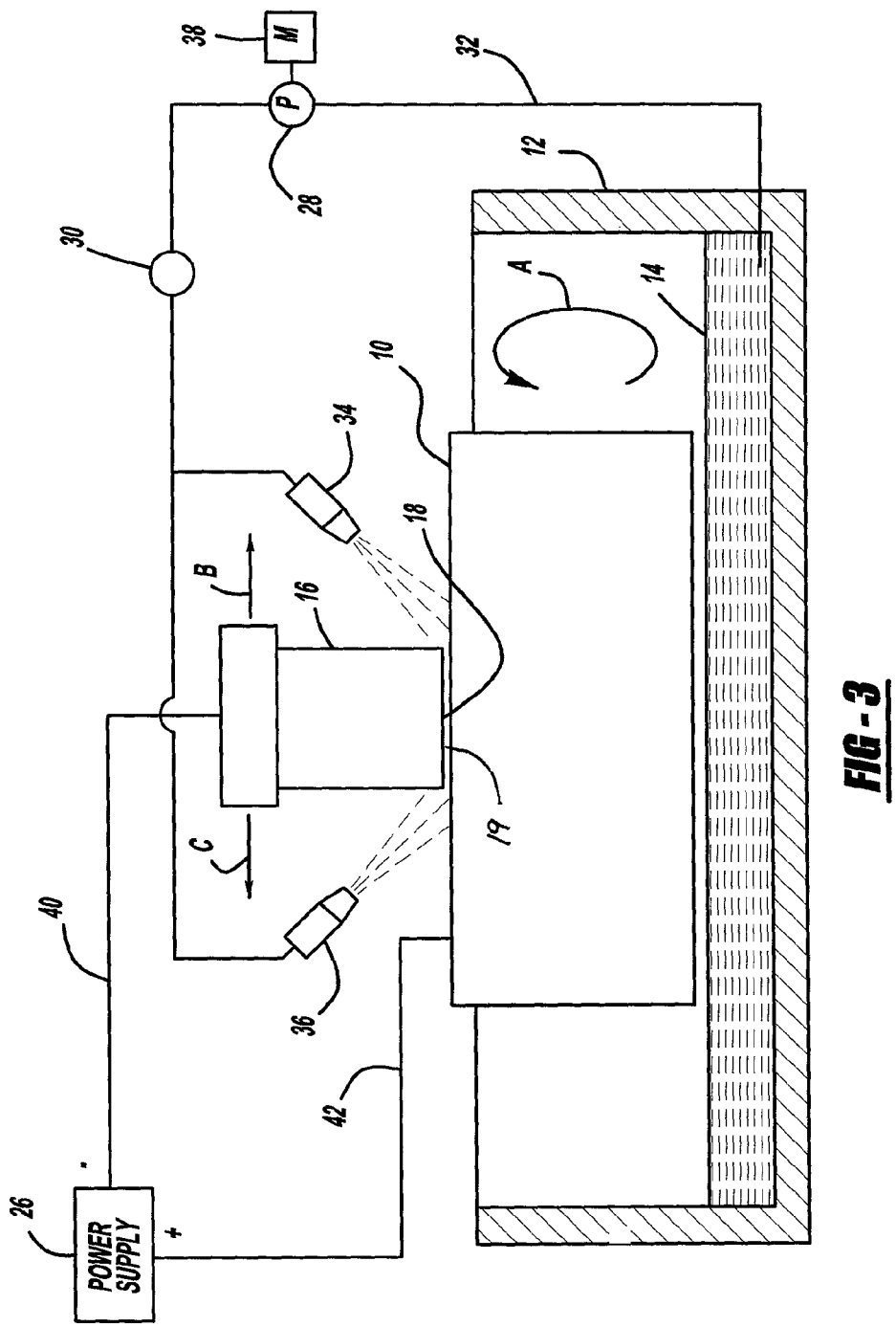
FIG. 3 is a partial schematic representation of the electrolytic reservoir and circuit of the pumped and filtered electrolyte supplied to the interface of the tool and workpiece.

With reference to FIGS. 2-8a, a metallic or conductive workpiece 10 to be provided with a microfinished outer surface or at least a portion of a microfinished outer surface is positioned within the housing 12 that contains an electrolytic solution 14. The workpiece 10 is mounted on a work spindle 16 which has been built to ensure the possibility of delivering current with the highest precision. Accordingly, a work spindle 16 is utilized to eliminate earlier prior art serious limitations on their ability to consistently deliver current, given the mechanical constraints due to the high speed rotation. Similarly, a microfinishing tool or stone 18 with a tool surface 19 is mounted on a tool spindle 20 having identical characteristics to the spindle utilized to hold the workpiece 10. The tool surface 19 is positioned very close to the workpiece 10. Both the tool spindle 20 and work spindle 16 are electrically isolated so that during the machining process the workpiece 10 becomes the positive pole (anode) and the microfinishing tool 18 becomes the negative pole (cathode) in a direct current circuit. In FIG. 3, the workpiece 10 is illustrated as a cylindrical rod, and is caused to rotate about its longitudinal central axis in a given direction in a conventional manner as indicated by arrow A. The microfinishing stone or tool 18 is caused to rotate and/or reciprocate relative to the workpiece 10 as indicated by arrows B and C. Each spindle 16, 20 driven by its own motor, is mounted on its own separate tool slide 22, 24 which is able to control the feed rates with less than 1% variation. Both tool slides 22, 24 are mounted on respective ball screws (not shown) so that the feed rate and work spindle 16 movement can be modulated during the course of the cut to constantly maintain optimal levels of operation. Precise modulation of the electrical output of the microfinishing machine and electrochemical discharge process, in order to ensure a precise cut is made possible by precise modulation and maintenance of optimal levels of electrical current. This is accomplished by the use of a solid state power supply 26 capable of on-time voltage control, ranging from 0-18 volts, with current capabilities ranging from 0 to 1000 amp. The response time of the unit is several orders of magnitude faster than what is used in traditional power supplies for prior art applications. This is to ensure that there is virtually no lag time between the detection of suboptimal performance of the electrical parameters and the resulting correction. Thus, power output is constantly modulated to guarantee that optimal levels of current arrive at the workpiece 10 at all times. This careful modulation of the solid state power supply 26 results in reduced power consumptions for the overall process.

In an electrolytic microfinishing operation, chips and debris from the cutting process are constantly flushed away from the interface between the microfinishing tool 18 and the workpiece 10 and accrue in the electrolyte solution 14. Since these materials are conductive and usually contain fairly large particles, the performance of the electrolyte solution 14, itself is conducive to changing its overall conductivity throughout the process and can lead to dramatic non-uniformities in the conductive properties of the electrolyte solution 14 on a second-by-second basis. To avoid this prior art condition, an electrolyte managing system, as well as a new line of electrolytes are used in the electrolytic microfinishing process to completely control the chemical properties of the process fluids, thereby optimizing fluid parameters at all times and removing excess contaminant chips and pollutants. This results in fluid being applied between the microfinishing tool 18 and workpiece 10 to be continuously consistent since the chips and debris are removed by the electrolyte management system long before they return to the microfinishing machine. Maintaining a constant medium of electrolyte solution 14 flowing between the tool 18 and workpiece 10 prevents erratic electrical performance during the electrolytic microfinishing process.

The juncture between the tool surface 19 of the microfinishing tool 18 and the workpiece 10 is continuously flooded, during the microfinishing operation, with the electrolytic solution 14 circulated from the sump of the housing 12 by pumping 28 the electrolytic solution 14 through the filtering system 30, which maintains the electrolyte in an optimal condition to maintain constant conductive properties. The electrolyte is pumped along conduit 32 through nozzles 34, 36 by a pump 28 driven by a motor 38.

A direct current electrical potential is maintained across the juncture between the workpiece 10 and the microfinish tool 18 by the solid state power supply 26 that is electrically connected to the microfinishing tool 18 by a current carrying line 40, and is also electrically connected to the workpiece 10 by a current carrying line 42. Modulation of the solid state power supply 26, as well as sensing the spindle parameters, including the workpiece properties and the consistent fluid parameters, are all carefully monitored by a programmable microfinishing process controller whose function is integrated into each of the components of the electrolytic microfinishing system to provide on-time monitoring, diagnosis, and control of the parameters of the electrolytic microfinishing process. Since each of the parameters and performance characteristics of the various components are carefully monitored by sensors, the optimum parameters for the specific microfinishing process can be preset for a specific workpiece 10 so that the controller can oversee the implementation of the optimal microfinishing settings. Accordingly, each component of the microfinishing system can be set to do what it needs to do and further monitored to ensure that it is performing according to its preset programmed conditions. The resulting electrolytic microfinishing process thereby reduces cycle time by enabling faster material removal than previously accomplishable, reduces the machining steps, in that, better finishes are accomplishable with fine grit abrasives in a one step operation as compared to the previous three prior art steps required to finish a single piece. Because of the unique filtration system 30 within the electrolyte solution 14 and the use of little or no pressure between the microfinishing tool 18 and workpiece 10, the conventional abrasives will not be forced into the workpiece surfaces as experienced with prior art microfinishing processes. Finally, the electrical flow and the current density of the electrolyte solution 14 can be carefully controlled in the final seconds of the electrolytical microfinishing operation to ensure improved surface finishes previously unaccomplishable with prior art microfinishing equipment as known today. The solid state power supply 26, microfinishing process controller 44, electrolyte filtration system 30 and microfinishing tools 18 are all currently available from Composition Corporation, Brooklyn, N.Y.

In FIG. 3, the microfinishing tool or stone 18 with the tool surface 19 is positioned very close to, or in approximate contact with the workpiece 10. The stone 18 is caused to rotate and/or reciprocate relative to the workpiece 10 as indicated by arrows B and C. By carefully controlling the feed rate in the very final seconds of the process, the positioning of the microfinishing tool 18 relative to the workpiece 10 ensures that no abrasive particles were transferred from the tool surface 19 of the microfinishing tool 18 to any treated portion of the surface of the workpiece 10 since the chemically consistent electrolyte solution 14 will be flushing the abrasive particles away from the juncture of the microfinishing tool 18 and workpiece 10. At this juncture, between the tool surface 19 of the microfinishing tool 18 and workpiece 10 the area is continuously flooded with the chemically consistent electrolyte solution 14 pumped from the filtering system 30 to the nozzles 34, 36 along a conduit 32 through the use of a pump 28 that is driven by a motor 38. By eliminating any contact between the workpiece 10 and the microfinishing tool 18 and reducing the voltage and current density in the final seconds of the cycle, no abrasive particles from the tool surface 19 will be embedded into the workpiece 10 and the resultant smoothness characteristics of the surface will be better than any previously available by any conventional microfinishing method known to date. The results of individual testing reflected that by introducing electric current into the microfinishing process, the workpiece 10, which is the positive pole, and the microfinishing tool 18, the negative pole, in a direct current circuit resulted in stock removal which was many times faster than by conventional microfinishing known to date. Material hardness, like carbide or other very tough stellite materials did not noticeably change the removal speed and tool wear was not noticeable. The process results in reducing tool costs many fold, the clamping force between the workpiece 10 and the microfinishing tool 18 being only a fraction of that of conventional microfinishing resulting in completely eliminating any distortion whatsoever as a result of the clamping forces between the workpiece 10 or the tool 18. While using a direct current voltage (10 to 18 volts) during the roughing portion of the cycle and lowering the voltage during the finishing portion of the cycle (9 volts down to 1 volt) the stock removal was reduced almost linear but the surface finish was significantly better even using a rough grit stone 18. At 1 volt and at a slower feed rate, it was possible to obtain a surface finish of 0.0067 μm $R_a$ which is equal to 0.26 μin $R_a$. This is lower than any conventional microfinishing operation previously obtainable with prior art equipment known to date.

Figure 4:
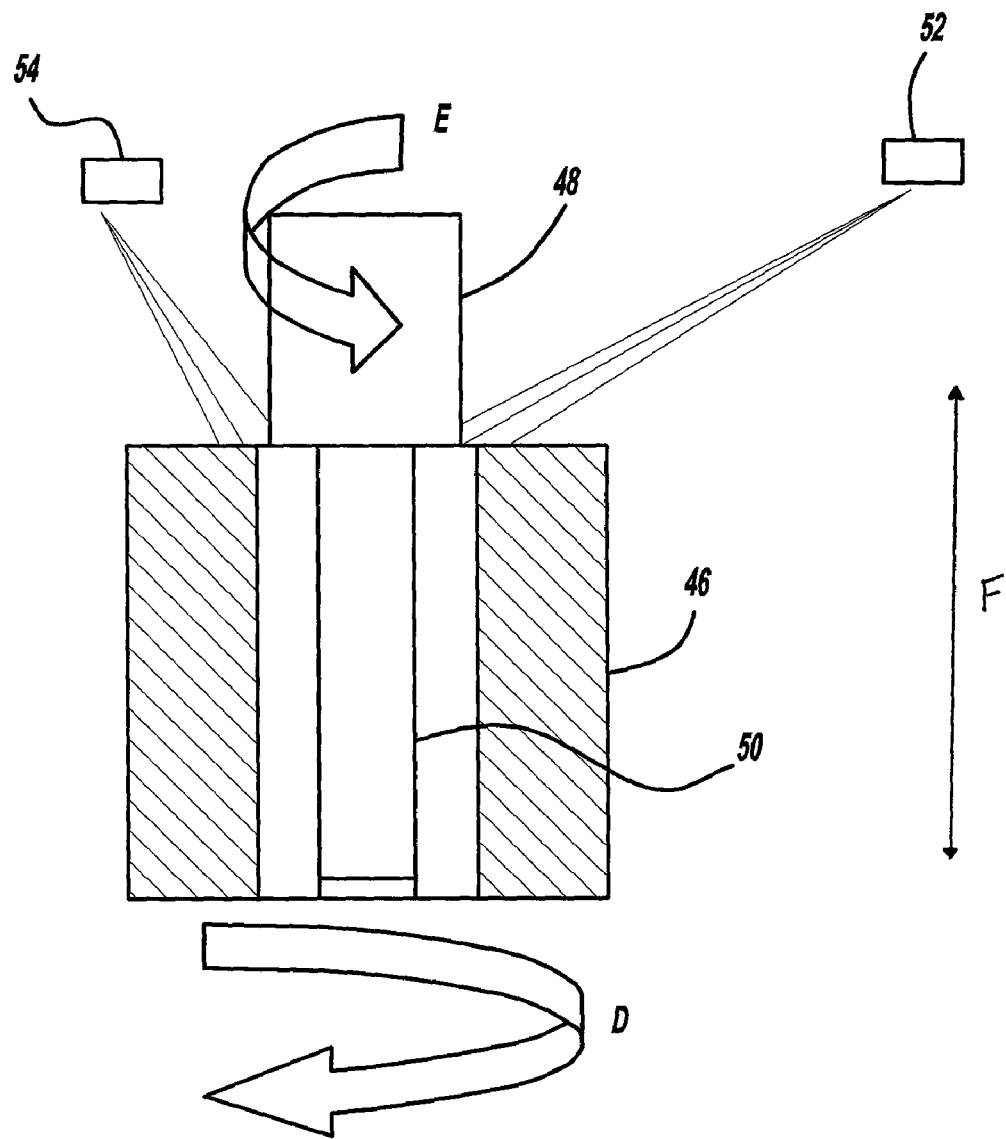
FIG. 4 is a partial schematic view of an alternate embodiment of a tool and workpiece of the present invention.

FIG. 4 illustrates the practice of the present invention in connection with the machining of an internal surface of an annular workpiece 46 by way of a tool 48 that has a tool surface 50. The annular workpiece 46 is caused to rotate as indicated by arrow D, and the tool 48 is caused to rotate as indicated by arrow E. The microfinishing tool 18 is also caused to reciprocate as indicated by arrow F in FIG. 4. An electrolytic solution 14 from a sump housing, not shown, is directed to the juncture between the tool surface 50 of the tool 48 and the adjacent, internal surface of the annular workpiece 46 by nozzles 52, 54. A direct current electrical potential is maintained across the gap between the tool surface 50 of the tool 48 and the internal surface of the annular workpiece 46, as is generally described in connection with FIGS. 2 and 3. While the tool surface 50 of the tool 48 may be, and preferably is embedded with abrasive particles, transfer of abrasive particles from the tool surface 50 to the adjacent internal surface of the annular workpiece 46 is prevented by avoiding, or greatly reducing, contact pressure between the tool surface 50 and the adjacent surface of the annular workpiece 46, and utilizing the various process elements recited above with respect to FIGS. 2 and 3, resulting in surface finishes lower than any conventional microfinish operation previously obtainable with prior art equipment known to date.

Figure 5:
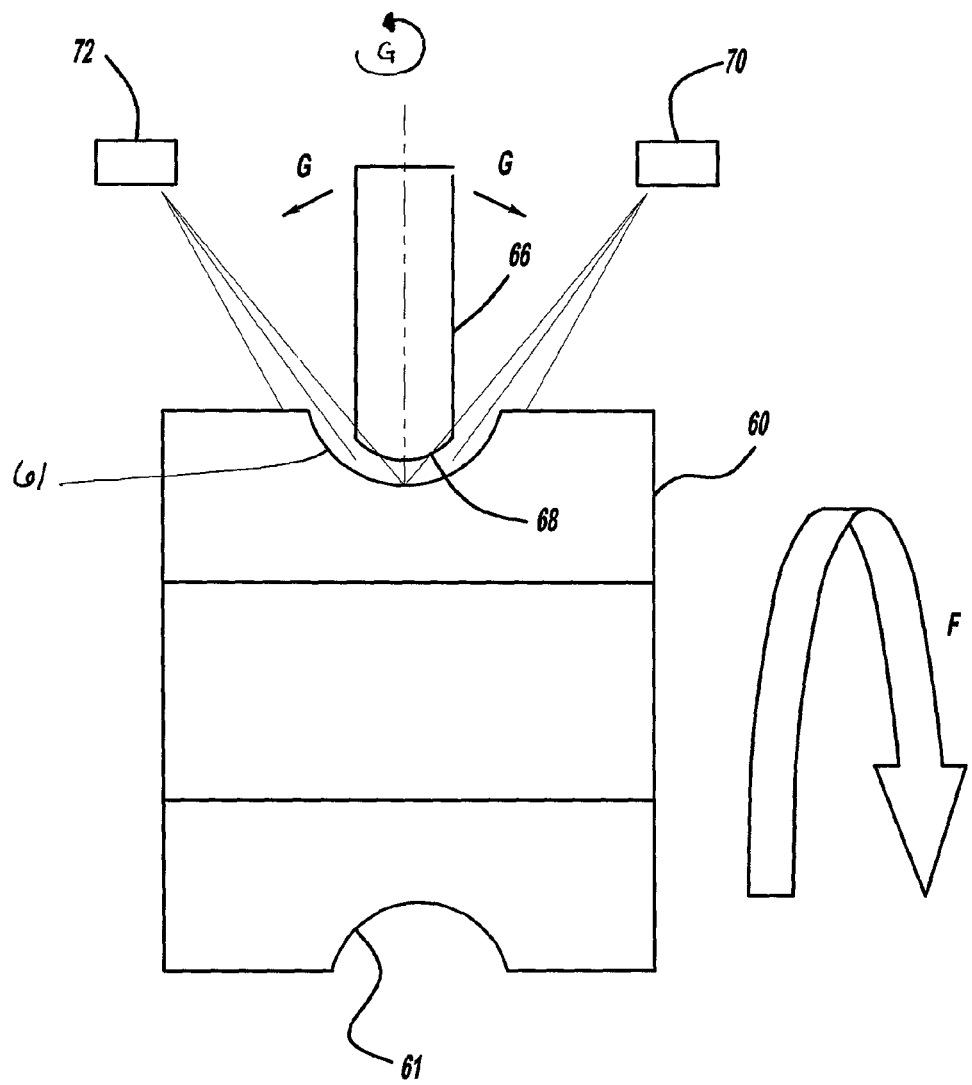
FIG. 5 is a partial schematic view of a further alternate embodiment of the present invention.

FIG. 5 illustrates the practice of the present invention in connection with the machining of an annular, concave portion or surface 61 of an external surface of a workpiece 60, which is shown as having an annular workpiece, by way of a tool 66 that has a tool surface 68 of convex configuration. A workpiece 60 is caused to rotate as indicated by arrow F, and the tool 66 is caused to oscillate and rotate as indicated by arrows G. An electrolytic solution 14, from a sump (not shown) is directed to a juncture between the annular, concave portion 61 and the tool surface 68 by nozzles 70, 72. A direct current electrical potential is maintained across a juncture between the tool surface 68 of the tool 66 and the annular, concave surface 61 of the workpiece 60 in a conventional manner, as generally described in connection with FIGS. 2 and 3. While the tool surface 68 of the tool 66 may consist of abrasive particles, transfer of abrasive particles from the tool surface 68 of the tool 66 to the annular, concave surface 61 of the workpiece 60 is prevented by avoiding, or controlling, the parameters of the process elements recited above with respect to FIGS. 2 and 3. The surface finish obtainable is many times better than any conventional microfinish operation previously obtainable with prior art microfinishing equipment known to date.

Figure 6:
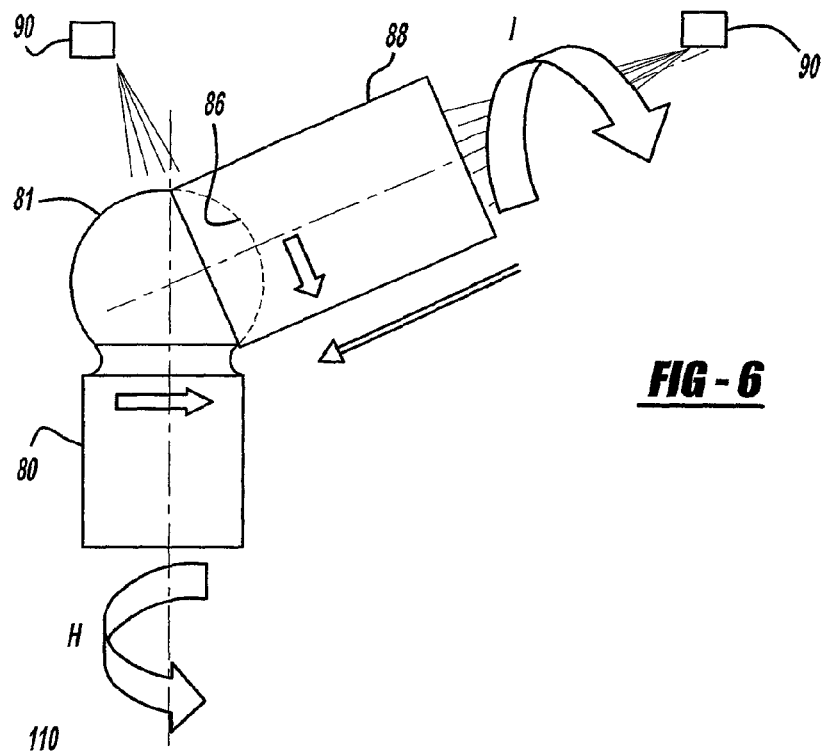
FIG. 6 is a partial schematic view of a further alternate embodiment of the present invention.

FIG. 6 illustrates the practice of the present invention in connection with the machining of a contoured surface portion 81 of a metallic workpiece 80 by way of a tool 88 that has a tool surface 86 of contour configuration. The metallic workpiece 80 is caused to rotate as indicated by arrow H, and the tool 88 is caused to rotate, as indicated by arrow I and oscillate. An electrolytic solution 14, from a sump, not shown, is directed to a juncture between the tool surface 86 of the tool 88 and the contoured surface portion 81 of the metallic workpiece 80 from a nozzle 90. A direct current electrical potential is maintained across the juncture between the tool surface 86 of the tool 88 and the contoured surface portion 81 of the metallic workpiece 80, as generally described in connection with FIGS. 2 and 3, above. While the tool surface 86 of the tool 88 may be, and preferably is, embedded with abrasive particles, transfer of abrasive particles from the tool surface 86 of the tool 88 to the contoured surface portion 81 of the metallic workpiece 80 is prevented by using the processing elements disclosed with respect to FIGS. 2 and 3.

Figure 7:
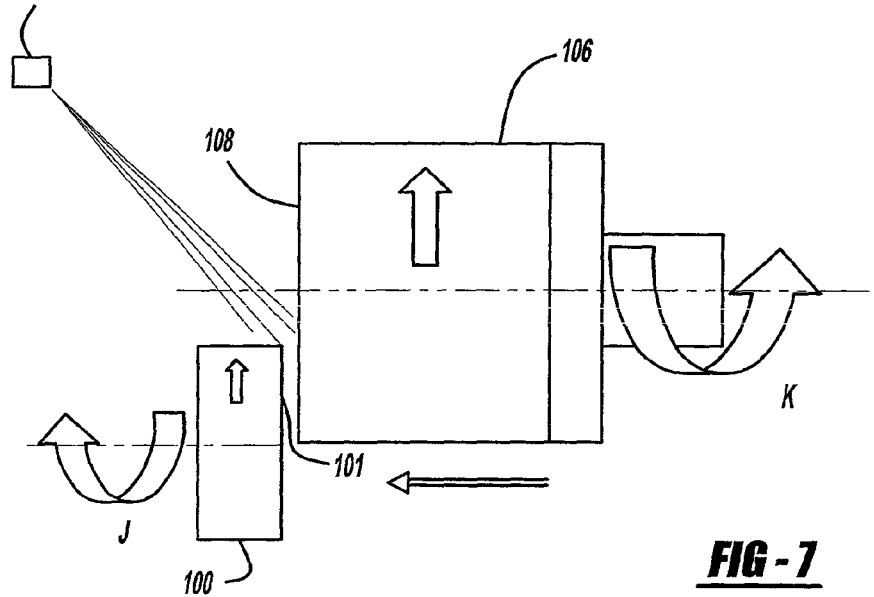
FIG. 7 is a partial schematic view of yet another embodiment of the present invention.

FIG. 7 illustrates the practice of the present invention in connection with the machining of a surface portion 101 on a metallic workpiece 100 by way of a tool 106 that has a tool surface 108. The metallic workpiece 100 is caused to rotate as indicated by arrow J, and the tool 106 is caused to rotate as indicated by arrow K and/or oscillate. An electrolytic solution 14, from a sump, not shown, is directed to a juncture between the surface 108 of the tool 106 and the surface portion 101 to the metallic workpiece 100 from a nozzle 110. A direct current electrical potential is maintained across a juncture between the surface 108 of the tool 106 and the surface portion 101 of the metallic workpiece 100 as generally described in connection with FIGS. 2 and 3.

Figure 8A:
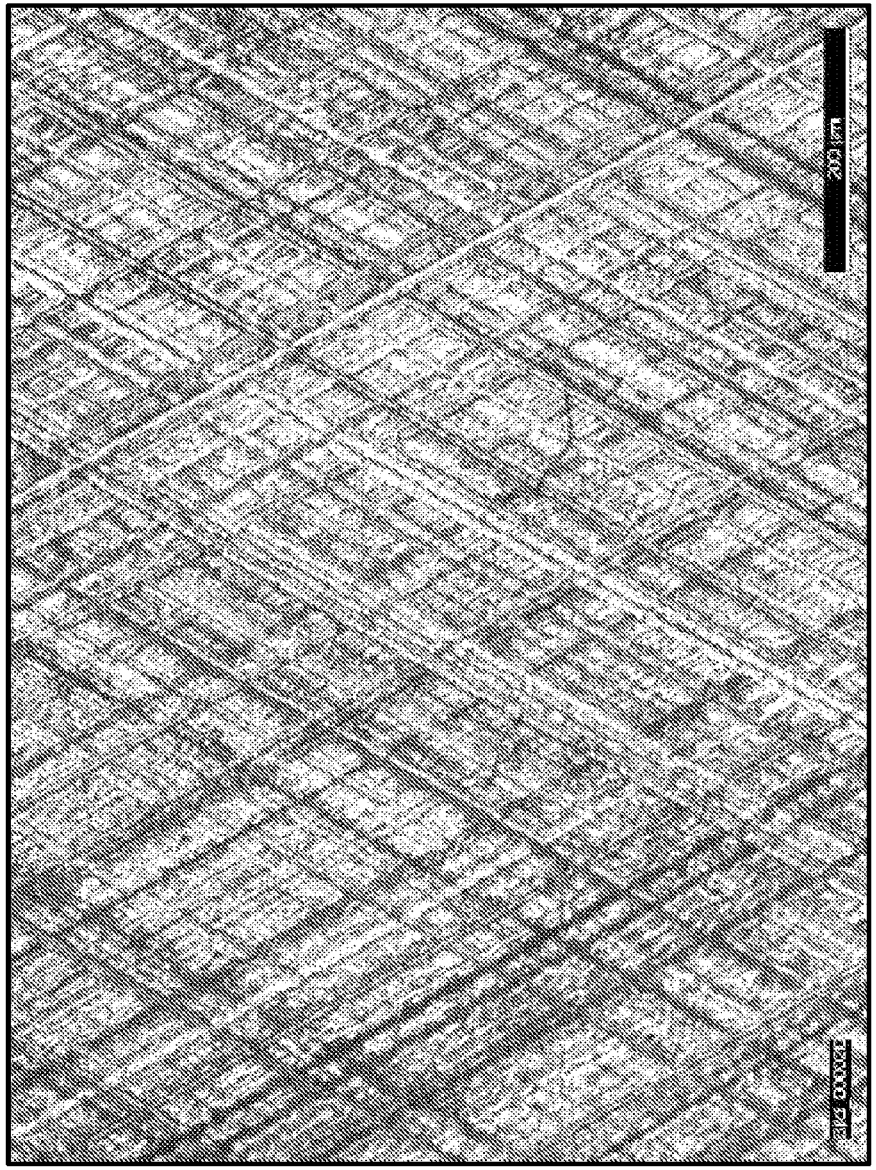
FIG. 8a is a photo micrograph of a test sample of a seal ring surface, shown at 200 μm magnification, conventionally machined using a prior art microfinishing process.
Figure 8B:
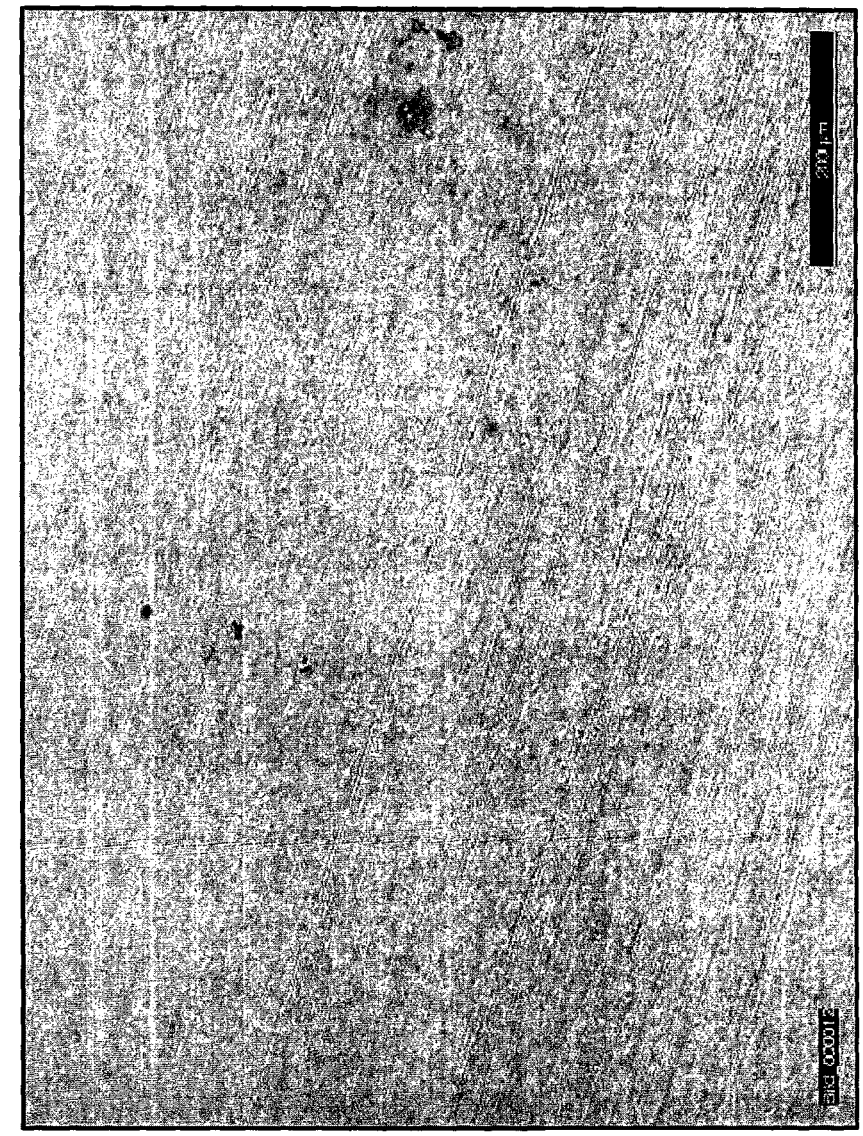
FIG. 8b is a photo micrograph, shown at 200 μm magnification, of the same test sample seal ring machined according to the process of the invention using a 5 volt potential across the juncture between the workpiece and the microfinishing tool.

FIGS. 8a-8b are photo micrographs comparisons of the surface finish of a test sample of a seal ring which was machined according to a prior art finishing process (FIG. 8a), and the new inventive process disclosed herein (FIG. 8b). In FIG. 8b, the voltage potential across the juncture between the tool and the workpiece was set to 5 volts. The two figures are at the same 200 µm magnification.

The test was conducted using tool and workpiece spindles with micro sense controls on the feed system and a collector for isolation of the spindles from the workpiece and tool respectively. A cup wheel was used as a tool and mounted in line with the seal ring surface but offset so that the O.D. of the cup wheel was centered to the seal ring. The tool was rotating in one direction while the seal ring was rotating in the opposite direction. The tool slide was moved in a direction approaching the seal ring. An electrolyte is introduced to the gap between the tool face and the seal ring surface. A direct current power voltage was established across the tool and the face of the seal ring. As the seal ring face approaches the tool, the amperage increases and identifies the distance between the tool surface and the seal ring. The amperage controls the feed rate while finished machining the tool. As the tool approaches the work face, the surface of the seal ring decomposes and the decomposed material is removed by the interaction of the rotating cup wheel and the flow of the electrolyte. When approaching the final finish of the cycle, which is detected by the position of the lead screw on the tool slide feed system, the voltage of the direct current power supply is modulated and lowered which results in the decomposition process and feed rate slowing down until in the final moment (less than one second), in the finishing operation, the direct current power is substantially turned off and the cup wheel almost touches the seal ring. The final size of the seal ring is detected by a process gauge. The results in terms of surface finish were measured using conventional measuring instruments. In FIG. 8a, that is, the conventional microfinishing process, the surface finish measured to be $R_a=0.01$ µm. This was accomplished with a 400 grit rough silicon carbide tool and a final 1000 grit finish using two passes for a total cycle time of approximately 30 seconds. FIG. 8b, which is made according to the inventive process disclosed herein, was obtained by beginning the decomposition of the material at the beginning of the cycle at a 9 volt setting and then modulating the voltage in the last few seconds of the cut to 5 volts. This resulted in a surface finish measured at $R_a=0.007$ µm.

Clearly, the results of the process of the invention represent significant advantages in surface finish over the prior art microfinishing process while significantly reducing the cycle time to less than half of the conventional prior art microfinishing operation cycle time. Further, the stock removal was many times faster using a higher voltage while the material hardness did not noticeably change the removal speed. The tool wear was not noticeable resulting in significantly reduced tool costs. The clamping forces between the workpiece and tool are only a fraction of that of conventional microfinishing or fine grinding. Accordingly, the clamping force on a workpiece will not result in distorting the workpiece during the operation. It appears that a single step process can be used by using a higher voltage during the roughing operation (10-24 volts) and lowering the voltage during the finishing portion of the cycle (9 volts down to 1 volt). Although the stock removal was reduced almost linear, the quality of the surface finish was also significantly enhanced. At 1 volt and a slower feed rate, surface finishes as low as $R_a=0.0067$ µm where accomplishable, which is lower than any conventional fine grinding or microfinishing operation known to date.

While the present invention has been described in terms of a preferred embodiment, it is apparent that other forms could be adopted by one skilled in the art. In other words, the teachings of the present invention encompass any reasonable substitutions or equivalents of claim limitations. For example, the structure, materials, sizes and shapes of the individual components could be modified, or substituted with other similar structure, materials, sizes and shapes. Those skilled in the art will appreciate that other applications, including those outside of the stated industries, are possible with this invention. Accordingly, the scope of the present invention is to be limited only by the following claims.

What is claimed is:

1. A method of electrolytically microfinishing a workpiece, said method comprising the steps of:
   electrically isolate a work spindle of a prior art microfinishing machine;
   electrically isolate a tool spindle of a prior art microfinishing machine;
   loading a tool and a workpiece in said electrically isolated tool spindle and said electrically isolated work spindle respectively;
   providing a continuously modulated power supply having an anode of said power supply connected to one of said workpiece and said tool and a cathode of said power supply connected to the other of said tool and said workpiece whereby upon activation of said power supply a direct current circuit is established external to said tool and said workpiece;
   pumping an electrolytic fluid in a closed loop circuit and directing a stream of said electrolytic fluid over the external juncture of said tool and said workpiece in the presence of said direct current circuit supplied by said modulated power supply;
   providing a housing reservoir for collecting said electrolytic fluid after said electrolytic fluid passes between said workpiece and said tool;
   providing a means for maintaining said electrolytic fluid, pumped external to said tool and said workpiece, chemically consistent so as to maintain uniform conductance properties of said electrolytic fluid as it is passed over said tool and said workpiece, said step of providing said means for maintaining said chemically consistent electrolytic fluid further comprising the step of filtering said electrolytic fluid to maintain consistent properties and to remove excess contaminants, chips and pollutants therefrom;

simultaneously rotating said workpiece, and rotating, oscillation/orbiting said tool at a start position in the presence of said electrolytic fluid;

advancing said tool toward said workpiece at a first predetermined feed rate and voltage at a significantly reduced contact pressure between said workpiece and said tool to rapidly decompose excess workpiece material whereby the material of said workpiece is decomposed by said electrolytic fluid pumped to flow between the moving surfaces of said tool and said workpiece such that said tool carries the electrolytic fluid into said material of said workpiece to bring about the decomposition of said material of said workpiece without the formation of arcs between said tool and said workpiece;

further advancing said tool toward said workpiece at a second slower final predetermined feed rate and voltage wherein said tool and said workpiece are not in direct contact with each other until final geometry and surface parameters are accomplished;

monitoring and controlling said workpiece, tool, electrolytic fluid, work spindle, power supply, and tool spindle parameters in a process control unit so as to maintain optimal microfinish parameters of each of said elements during the complete microfinishing cycle to prevent the formation of a recast layer on said workpiece; and return said tool spindle and said workpiece to said start position and unload said finished workpiece.

2. The method of electrolytically microfinishing a workpiece as claimed in claim 1 wherein said monitoring and controlling step further comprises the step of decomposing said material of said workpiece at a first predetermined voltage during said first predetermined feed rate to remove excess workpiece material; and the step of decomposing said material of said workpiece at a second predetermined voltage during said second slower predetermined feed rate, said second slower predetermined feed rate and second predetermined voltage of said work cycle generating the final form of said workpiece and associated surface parameters.

3. An electrolytic microfinishing apparatus comprising:
an electrically conductive circuit comprising:
  a workpiece mounted on a work spindle;
  a tool mounted on a tool spindle adjacent said workpiece;
  means for rotating said workpiece, said rotating means coupled to said workpiece;
  means for rotating and oscillating/orbiting said tool, said means for rotating and oscillating/orbiting coupled to said tool;
  an electrical power means having an anode connected to one of said tool and said workpiece and a cathode connected to the other of said workpiece and said tool;
  means for modulating said power means so as to control said means for moving said tool during the entire cycle time;
  means for directing a stream of electrolyte over said tool and said workpiece to flood the gap between said tool and said workpiece, said means for directing said stream of electrolyte comprising:
    a housing reservoir;
    a pump mounted adjacent said housing reservoir;
    a filtering unit mounted downstream of said housing, said filtering unit maintaining uniform conductance properties of said electrolyte so as to maintain said electrolyte chemically consistent as said electrolyte is pumped to direct said stream of electrolyte to flood the gap between said tool and said workpiece, said filtering unit further removing excess contaminants, chips and pollutants from said electrolyte; and
    a plurality of nozzles mounted external to and adjacent said tool and said workpiece to deliver said stream of electrolyte to said tool and workpiece;
  means for advancing said tool towards said workpiece at a first predetermined feed rate and voltage to rapidly decompose excess workpiece material whereby the material of said workpiece is decomposed by said electrolyte pumped to flow between the moving surfaces of said tool and said workpiece such that said tool carries said electrolyte into said material of said workpiece to bring about the decomposition of said material of said workpiece without the formation of arcs between said tool and said workpiece;
  means for further advancing said tool towards said workpiece at a second slower final predetermined feed rate and voltage wherein said tool and said workpiece are not in direct contact with each other until final geometry and surface parameters are accomplished; and
  means for monitoring and controlling the operating parameters of said tool, workpiece, electrolyte, work spindle, tool spindle and electrical power means so as to obtain feedback from said various components of said electrolytic microfinishing apparatus and maintain optimal parameters of each said component during the complete electrolytic microfinishing process to prevent the formation of arcs and associated recast layer.

4. The electrolytic microfinishing apparatus as claimed in claim 2 wherein said monitoring and controlling means further comprises means for setting a predetermined voltage across said tool and said workpiece to remove excess material from said workpiece in the beginning portion of a work cycle in the presence of an electrolyte; and
means for continuously adjusting the voltage across said tool and said workpiece to control the feed rate of said tool and the associated decomposition of said workpiece during the final portion of said work cycle to provide optimal surface parameters of said workpiece surface.

* * * * *